(12) United States Patent
Miyake et al.

(10) Patent No.: US 7,148,451 B2
(45) Date of Patent: Dec. 12, 2006

(54) RICE COOKER

(75) Inventors: Takamura Miyake, Toyota (JP); Haru Miyake, 36-2, Yomogidai 1-chome, Maito-ku, Nagoya-shi, Aichi-ken, 465-0091 (JP)

(73) Assignee: Haru Miyake, Aichi-Ken (JP)

( * ) Notice: Subject to any disclaimer, the term of this patent is extended or adjusted under 35 U.S.C. 154(b) by 0 days.

(21) Appl. No.: 11/076,701

(22) Filed: Mar. 10, 2005

(65) Prior Publication Data

US 2005/0199608 A1     Sep. 15, 2005

(30) Foreign Application Priority Data

Mar. 11, 2004   (JP)   ............... 2004-068625

(51) Int. Cl.
*A47J 27/08* (2006.01)
*A47J 27/092* (2006.01)
*A23L 1/182* (2006.01)

(52) U.S. Cl. ............... 219/440; 219/439; 426/507; 426/508; 426/523; 99/330; 99/337; 99/483

(58) Field of Classification Search .............. None
See application file for complete search history.

(56) References Cited

U.S. PATENT DOCUMENTS 4,438,324 A * 3/1984 Narita et al. ............... 219/441
6,283,014 B1 * 9/2001 Ng et al. ..................... 99/330
6,283,015 B1 * 9/2001 Kwon et al. ................. 99/337
6,685,979 B1 * 2/2004 Toyoshima et al. ......... 426/627
6,744,019 B1 * 6/2004 Takegoshi ................... 219/492

FOREIGN PATENT DOCUMENTS

| JP | 10248711 A | * | 9/1998 |
| JP | 200037296 A | * | 2/2000 |
| JP | 2001245786 A | * | 9/2001 |
| JP | 2003290032 A | * | 10/2003 |
| JP | 2004049337 A | * | 2/2004 |
| JP | 2004351004 A | * | 12/2004 |

OTHER PUBLICATIONS

KR2004065537A, Korean Patent abstract & figure, Yun et al, Jul. 2004.*

* cited by examiner

*Primary Examiner*—Joseph Pelham
(74) *Attorney, Agent, or Firm*—Flynn, Thiel, Boutell & Tanis, P.C.

(57) ABSTRACT

When water temperature is high and time germinating step is short, it is hard to cook freely to individual preference, and water turbidity and bad smell are likely to occur. By germinating with immersing brown rice or rice with the germ in water at 28 to 34 degrees for 3 to 6 hours in an inner pot 3, being followed by a cooking step successively, the rice can be immersed for a necessary time at low temperature, so that germinated rice with enough content of gamma-aminobutyric acid (GABA) can be obtained without causing water turbidity or bad smell.

16 Claims, 2 Drawing Sheets

RICE COOKER

BACKGROUND OF THE INVENTION

1. Field of the Invention

The present invention relates to a rice cooker capable of cooking the germinated rice immediately after germination of rice with the germ.

2. Description of the Related Art

A rice cooker capable of germinating rice with the germ, cooking successively, and presenting rice with the germ easily for consumption has been known so far, and, for example, in a rice cooker for cooking rice in a preset cooking step, rice with the germ and water necessary for cooking the rice with the germ are poured into an inner pot, the cooking step is preceded by a germinating step of germinating the rice with the germ by heating at a specified temperature for 15 minutes or more to 3 hours or less, and the germinating step is followed by the cooking step (see, for example, patent document 1).

[Patent document 1] Japanese patent publication No. 3484391 (pages 1 and 2, FIGS. 1, 3 to 5).

In the prior art, however, the required time of germinating step is short, and germination is not sufficient, and it is attempted to solve the problem by raising the water temperature in the germinating step, but if the germinating step time is short, it is hard to cook to the taste of the individual consumers, and the water may be turbid and smell bad depending on the temperature, and there has been a strong request for a type capable of germinating at low temperature.

SUMMARY OF THE INVENTION

The present invention is intended to solve the problems of the prior art, such as difficulty in cooking according to the individual taste, and turbidity and bad smell of water by the germinating step of high temperature and short time, and is characterized by germinating with immersing brown rice and rice with the germ in water at 28 to 34 degrees for 3 to 6 hours in an inner pot, being followed by a cooking step successively, and therefore by immersing for a necessary time at low temperature, it is known to reach a sufficient content of gamma-aminobutyric acid (GABA) without causing water turbidity or bad smell.

In short, the invention is characterized by germinating with immersing brown rice or rice with the germ in water at 28 to 34 degrees for 3 to 6 hours in an inner pot, being followed by a cooking step successively, and therefore while suppressing the malodorous components, the content of gamma-aminobutyric acid (GABA) can be raised to a certain extent, and the appearance of germinated rice is tasty with plump embryos.

Since the germinating step time is adjustable between 3 and 6 hours, it is possible to cook in a desired state of germination according to the individual preference.

A cooking timer is provided, and the duration until the germinating step starting time can be set by subtracting the cooking time and preset germinating time, and therefore the germinated rice can be cooked at a desired time from the timer setting time, and if the germinating step time can be set freely, the desired germinated rice suited to the individual taste can be cooked at a preferred time.

The lid incorporates a pressure regulating valve for opening automatically when the internal pressure reaches and exceeds the set pressure in the cooking step, and therefore the cooking time can be shortened.

The lid also incorporates an opening valve for opening automatically after cooking or in case of trouble of pressure regulating valve in the germinating step, and therefore malodorous components generated in the germinating step can be exhausted outside, and the cooked germinated rice is free from bad smell, and moreover the lid is opened forcibly by elevation of internal pressure due to trouble of pressure regulating valve, and scattering of the content can be completely eliminated, and outstanding practical effects are brought about.

DESCRIPTION OF THE PREFERRED EMBODIMENTS

Figure 1:
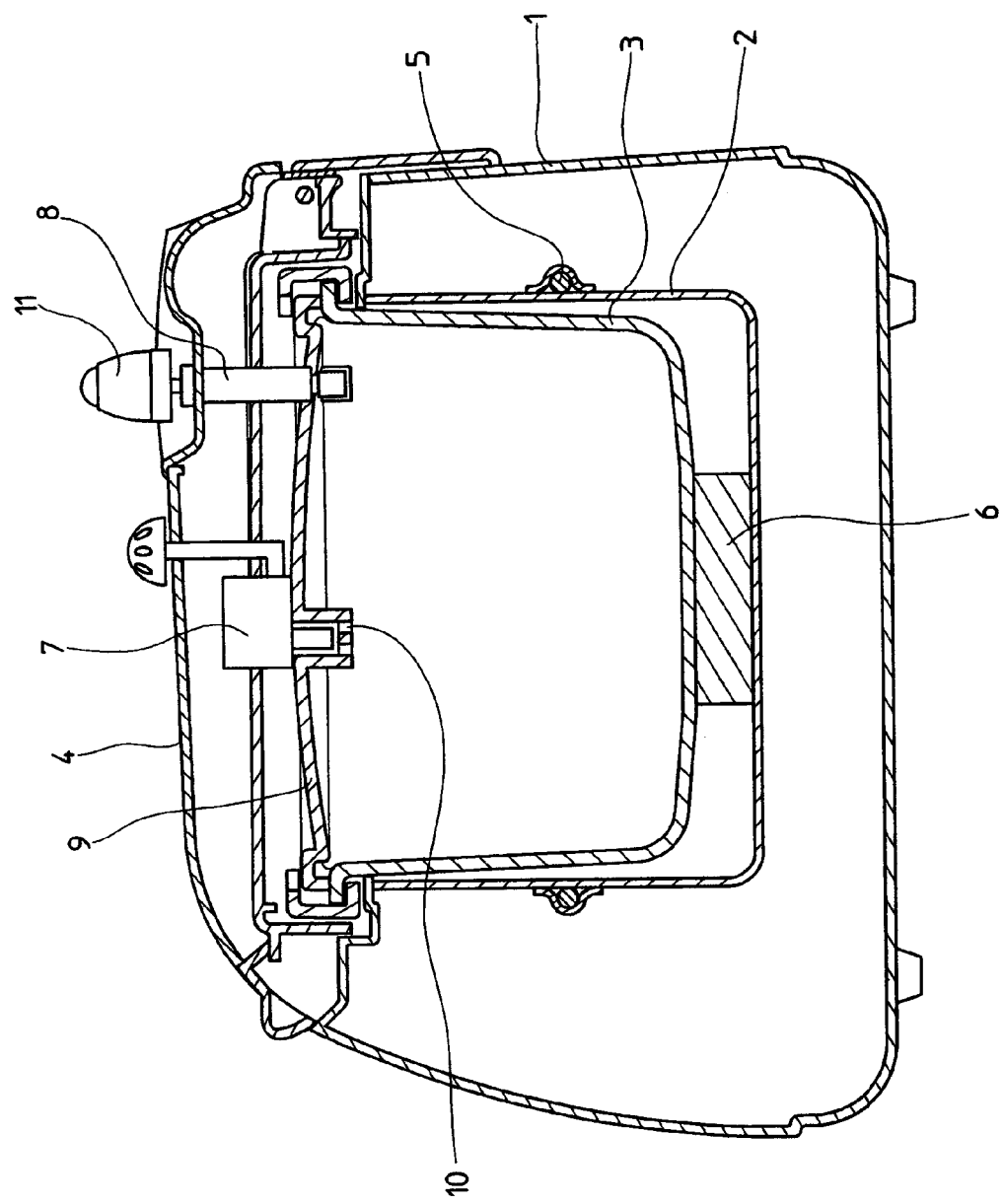
FIG. 1 is a schematic sectional view of rice cooker of the invention.

The pressure type rice cooker of the invention comprises a main body 1, an outer pot 2 contained therein, an inner pot 3 detachably accommodated in the outer pot 2, and a lid 4 openably and closably provided in the upper part of the main body 1.

Heating and insulating means 5 is provided in the outer circumference part of the outer pot 2, and heating means 6 of the inner pot 3 is provided in the inner bottom part.

The lid 4 incorporates an opening valve 7 and an automatic regulating valve 8 of internal pressure of the inner pot 3, and the opening valve 7 and automatic regulating valve 8 are disposed so as to penetrate through an inner lid 9 for closing the upper part of the inner pot 3, with the lower part provided in the lower part of the lid 4. The opening valve 7 makes use of solenoid, and can open or close a vent hole 10, and the automatic regulating valve 8 is the same as the one used in general pressure cooking pan, that is, a pressure regulating spindle 11 in the upper part is lifted by the internal pressure, thereby opening the valve.

Except for the cooking step, the opening valve 7 is open, and even during the cooking step, if the internal pressure is elevated by defect of the automatic regulating valve 8 or other trouble, the opening valve 7 is opened immediately. That is, before and during germinating step, the opening valve 7 is open to release the internal vapor to outside, and it is closed during the cooking step, and is opened at the end of the cooking step to release the internal pressure, so that the lid 4 can be opened safely.

The rice cooker of the invention is provided with timer setting function, and it is intended to set the cooking end time, and it is actually after the time of subtracting the germination setting time and cooking time from the timer setting time that the germinating step is started, that is, heating is started by the heating and insulating means 5 for raising the water temperature to 28 to 34 degrees. The cooking time is the duration required from the end of germinating step until reaching the insulating time completely.

It is hence impossible to set the timer in a time shorter than the sum of the germination setting time and cooking time.

The operation of the rice cooker of the invention is described below.

(1) Rice with the germ and necessary volume of water for germinating and cooking the rice with the germ are poured into the inner pot 3.

(2) The germinating step time is set.

(3) The timer is set as desired.

(4) The switch is turned on. Heating by the heating and insulating means 5 is started, and the water in the inner pot 3 is heated to 28 to 34 degrees, and the germinating step is started while keeping at the same temperature. If the timer has been set, the germinating step is started after the time of subtracting the germination setting time and cooking time from the timer setting time.

(5) After the germination setting time, heating by the heating and insulating means 5 is stopped, and heating by the heating means 6 is started at the same time, and the opening valve 7 in open state is closed, and the process is transferred to the cooking step, and the pressure regulating spindle 11 of the automatic regulating valve 8 is lifted irregularly, and steam is exhausted.

(6) After the cooking step, heating by the heating means 6 is stopped, and the process is simultaneously transferred to the insulating step by the heating and insulating means 5, and the opening valve 7 in closed state is opened and the internal pressure is lowered.

Figure 2:
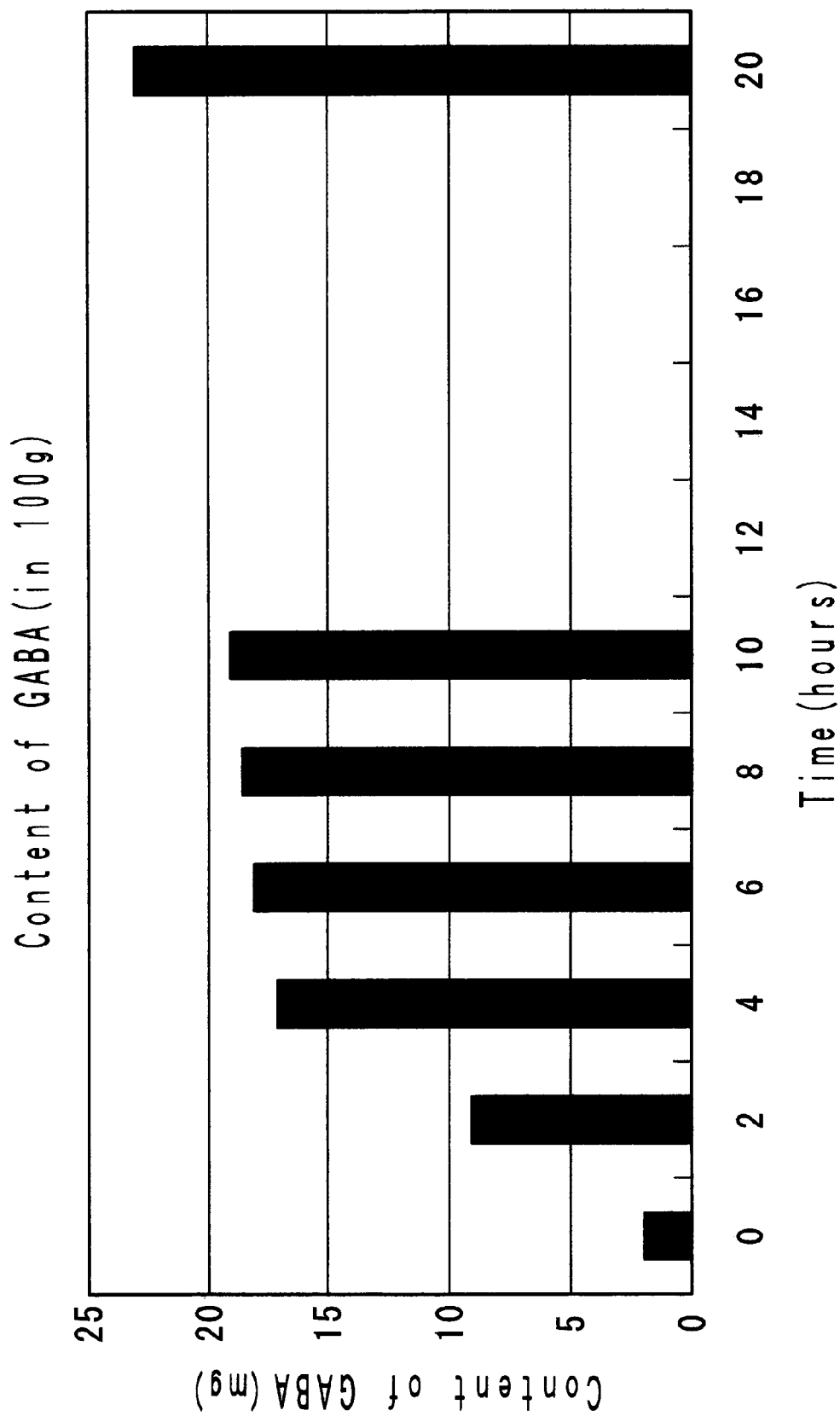
FIG. 2 is a diagram showing the time-course changes of content of gamma-aminobutyric acid in rice with the germ.

FIG. 2 is a graph showing the time-course changes of content of gamma-aminobutyric acid in the rice with the germ at water temperature of 28 degrees, in which it elevates suddenly in 0 to 4 hours, and change slowly thereafter, but if immersed for a long time, specifically over 6 hours, the malodorous components increase, and hence the germinating step is defined in a range of 3 hours or more until the germination is visually recognized and within 6 hours before malodorous components begin to increase.

That is, the timer setting time is, supposing the cooking time to be 1 hour, at least 4 hours or more.

What is claimed is:

1. A rice cooker characterized by germinating with immersing brown rice or rice with germ in water at 28 to 34 degrees for 3 to 6 hours in an inner pot, being followed by a cooking step successively, wherein the lid incorporates an opening valve for opening automatically after cooking and in case of trouble of pressure regulating valve in the germinating step and wherein the lid incorporates a pressure regulating valve for opening automatically when the internal pressure reaches and exceeds the set pressure in the cooking step.

2. The rice cooker of claim 1, wherein the germinating time can be adjusted by setting.

3. The rice cooker of claim 2, wherein a cooking timer is provided, and the duration until the germinating step starting time can be set by subtracting the cooking time and present germinating time from the timer setting time.

4. A rice cooker operation for germinating and cooking a brown rice or rice with the germ in a rice cooker having an inner pot and a lid incorporating a pressure regulating valve which defines a set pressure for cooking of the rice and an opening valve for releasing odorous gases during germination of the rice, the operation comprising the steps of:

placing rice and water in the inner pot and sealing the lid;

initiating a germination step, wherein the rice is germinated in the water at a set temperature for a set time in the inner pot, and wherein the opening valve is placed in an open position during the germination step to release objectionable odors from the odorous gases resulting from germination of the rice;

automatically initiating a cooking step after the germination step, wherein the pressure regulating valve is configured for opening automatically when the internal pressure reaches and exceeds the set pressure, and wherein the opening valve is normally closed during the cooking step and is configured for opening in case of failure of the pressure regulating valve; and automatic opening of the opening valve at the conclusion of the cooking step to release pressure below the set pressure.

5. The operation of claim 4, wherein the set temperature in the germinating step is in the range of 28 to 34 degrees.

6. The operation of claim 5, wherein the set time is in the range of 3 to 6 hours in the germinating step.

7. The operation of claim 4, wherein the set time is in the range of 3 to 6 hours in the germinating step.

8. A rice cooker having an inner pot and a lid, the lid including an opening valve having a closed position and an open position, and a pressure regulating valve, the rice cooker having two operational modes, the first operational mode being a germinating mode and the second mode being a cooking mode, wherein the germinating mode includes a control function operating the cooker at a first temperature for a first period, wherein the opening valve is in the open position, and wherein the cooking mode includes a control function operating the cooker at a set pressure, wherein the opening valve is in the closed position, and wherein the pressure regulating valve opens automatically when the internal pressure reaches and exceeds the set pressure in the cooking step, and wherein the opening valve is configured to open in the event of failure of the pressure regulating valve.

9. The rice cooker of claim 8, wherein the first temperature is in the range of 28 to 34 degrees.

10. The rice cooker of claim 9, wherein the first period is in the range of 3 to 6 hours.

11. The rice cooker of claim 8, wherein the first period is in the range of 3 to 6 hours.

12. The rice cooker of claim 8, further comprising a first heating and insulating unit, and the germinating mode further includes the heating and insulating unit being operational, and the cooking mode includes the heating and insulating unit being non-operational.

13. The rice cooker of claim 12, further comprising a second heating unit, and the germinating mode further includes the second heating unit being non-operational, and the cooking mode includes the second heating unit being operational.

14. The rice cooker of claim 13, wherein the rice cooker has a third operational mode being an insulating mode which includes the first heating and insulating unit being operational and the second heating unit being non-operational.

15. The rice cooker of claim 12, wherein the rice cooker has a third operational mode being an insulating mode which includes the first heating and insulating unit being operational and the opening valve being in the open position.

16. The rice cooker of claim 8, wherein the opening valve is in the open position upon termination of the cooking mode.

* * * * *